No. 726,071. PATENTED APR. 21, 1903.
F. KEES.
WALL FOR TANKS, STORAGE BINS, OR WAREHOUSES.
APPLICATION FILED MAY 6, 1901.
NO MODEL.

WITNESSES
P. R. Thompson

INVENTOR
FREDERICK KEES.
BY Paul & Hawley
ATTORNEYS

UNITED STATES PATENT OFFICE.

FREDERICK KEES, OF MINNEAPOLIS, MINNESOTA.

WALL FOR TANKS, STORAGE-BINS, OR WAREHOUSES.

SPECIFICATION forming part of Letters Patent No. 726,071, dated April 21, 1903.

Application filed May 6, 1901. Serial No. 58,914. (No model.)

*To all whom it may concern:*

Be it known that I, FREDERICK KEES, of Minneapolis, county of Hennepin, State of Minnesota, have invented certain new and useful Improvements in Walls for Tanks, Storage-Bins, or Warehouses, of which the following is a specification.

The invention relates to walls for storage tanks or bins; and the object of the invention is to provide a wall capable of resisting extreme lateral or bulging strain and one that can be quickly and economically built.

Other objects of the invention will appear from the following detailed description.

The invention consists generally in a wall comprising tension-bars arranged at intervals and having holes suitably spaced and a wire strung through said holes from bar to bar and stretched to greater than its normal length, said bars and wire being embedded in a suitable filling material.

Further, the invention consists in providing tension-bars and double rows of wires extending between the same around the bin and under tension, the outer wire in each wall of a series of polygonal bins forming the inner wire for the abutting wall.

Further, the invention consists in the novel construction of the tension-bars.

Further, the invention consists in various constructions and combinations, all as hereinafter described, and particularly pointed out in the claims.

Figure 1:
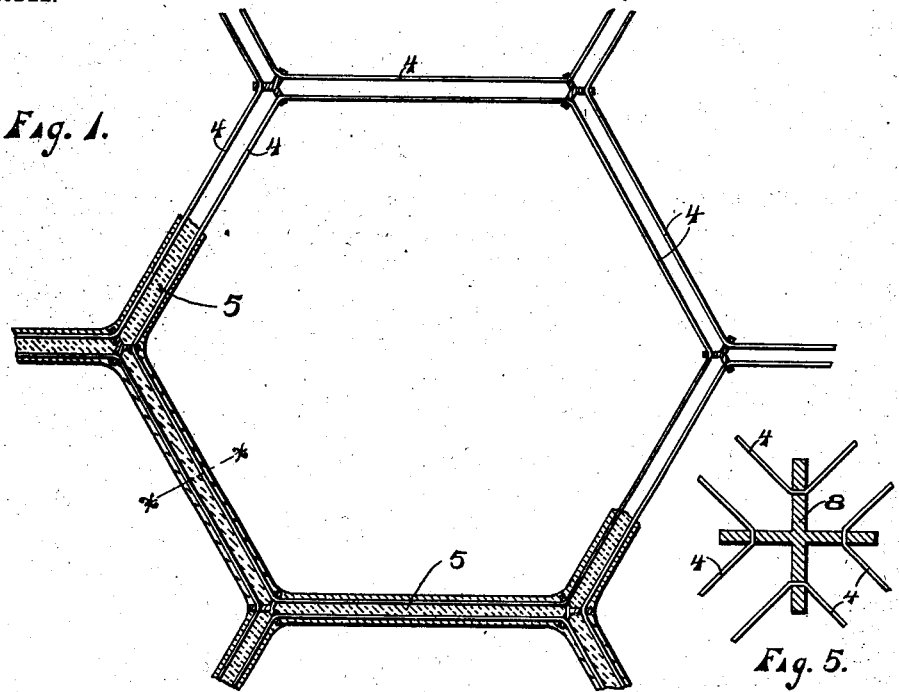
Figure 5:
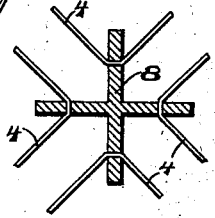
Figure 3:
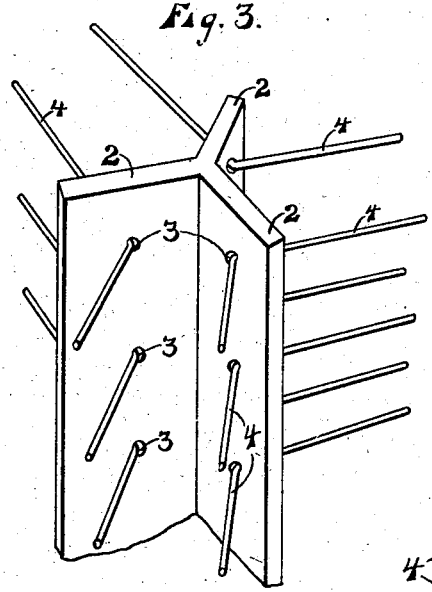
Figure 2:
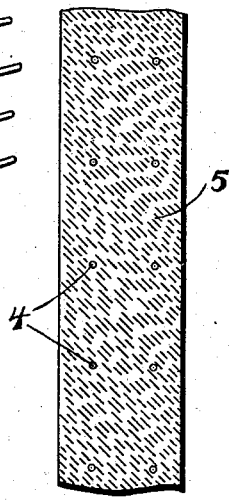
Figure 4:
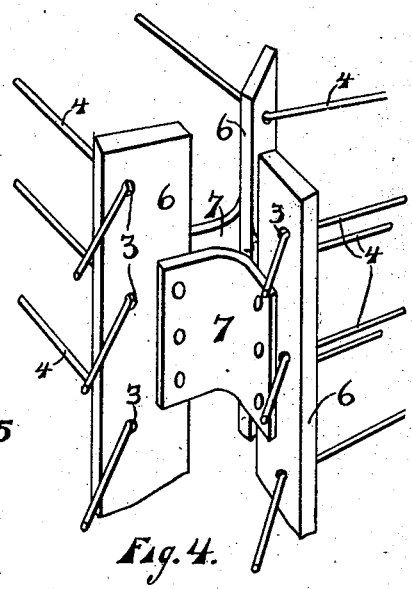

In the accompanying drawings, forming part of this specification, Figure 1 is a horizontal section of a bin having walls embodying my invention, the filling material on one side being broken away, exposing the wires. Fig. 2 is a section on the line *x x* of Fig. 1. Fig. 3 is a detail showing the manner of stringing the wires and connecting them to the tension-bars. Fig. 4 is a detail showing the modified construction of bar. Fig. 5 is a detail showing the bar adapted for use with square bins.

In the drawings I have shown a hexagonal bin or tank, as one having that number of sides is preferable on account of the convenience in fitting the walls of the adjoining tanks together and the economy in space. It will be understood, however, that I do not confine myself to a bin of this form, as my invention is applicable to those having a greater or less number of sides. At the intersection of the bin-walls, where this form is employed, I provide upright supports, which I prefer to designate by the term "tension-bars," as they do not aid in supporting the bin-walls, but merely permit tension to be applied to the wires that are strung between them and serve to support and separate the wires. These bars, comprising wings 2, radiating in opposite directions from the common center, form a three-winged bar that is triangular in cross-section. Each wing is provided with a series of holes 3 at suitable intervals therein, and the bars are placed upright at the junction-points of the walls. The holes 3 are opposite each other, and through these holes I pass wires 4, beginning at the bottom and stringing them through the holes around and around the bin to the top. As shown in Fig. 1, the wire strung between the inner wings will be carried continuously around the inside of the bin from bottom to top. The outside wires, however, will be strung along one side of one bin and then along the adjoining side of the next bin, and so on around to the starting-point. As the wires are strung between the bars they may be put under the desired tension by any suitable means, and when both rows have been put in place a filling of concrete 5 is placed between and around the wires and around the tension-bars, entirely covering and concealing them. As soon as the cement is set a continuous homogeneous wall will be provided for the bin, which will be bonded or tied together at all points and capable of resisting extreme lateral strain from either side.

It frequently happens that a bin will be full and the adjoining one empty, so that the bin-walls must be capable of resisting pressure from either side. The divergence or radiation of the wings 2 from a central point causes a V-shaped recess to be formed between them. The ends of the wall fitting into these recesses assume the shape of wedges, and when the filling material has become hardened the walls will be locked between the wings or flanges of the tension-bars.

In Fig. 4 I have shown bars made up of flat plates 6, that are connected by angle-plates 7 at intervals. The wires are strung through these bars in the manner heretofore described.

In Fig. 5 I have shown a bar having wings 8, that are adapted for use with square bins, there being four wings instead of three.

I prefer to use a light material for the tension-bars, their only function being to support and separate the wires. The wires of course will vary in size according to the size of the bin and the pressure to which its walls will be subjected.

A wall of this kind may be used in the construction of tanks of various kinds, as well as grain-bins, and also in storage or warehouses.

The holes in the wings I have shown opposite each other in parallel rows; but they may be alternately arranged and at different distances from the edges of the wings, if preferred.

Having thus described my invention, I claim as new and desire to secure by Letters Patent—

1. A series of abutting hexagonal tanks or bins, comprising upright bars at the meeting-points of their walls, said bars having wings or flanges radiating from a common center, double rows of wires strung under tension between said bars and passing through holes provided at intervals in said wings, and a concrete filling wherein said bars and wires are embedded.

2. A series of abutting storage bins or tanks polygonal in form, comprising flanged bars at the intersections of the walls, and wires strung side by side in rows from bar to bar through holes provided therein and stretched to greater than their normal length, the outer wire in each bin-wall forming the inner wire for the abutting wall, and a suitable filling material.

3. A polygonal tank or bin, comprising upright metal bars at the meeting-points of said walls, a double row of wires strung under tension between said bars from the top to the bottom of the bin, and a concrete filling wherein said bars and wires are embedded substantially as described.

4. A tank or bin wall, comprising tension-bars of comparatively thin material arranged at intervals and having rows of holes suitably spaced, and a single wire strung through said holes from bar to bar and extending in rows one above the other from the bottom to the top of the wall and stretched to greater than its normal length, and a suitable filling material wherein said wire and bars are embedded.

5. A series of abutting tanks or bins, comprising upright bars at the meeting-points of their walls, said bars having radiating wings or flanges provided with rows of holes or perforations, double rows of wires strung under tension between said bars and passing through said holes around the bins, and a concrete filling wherein said bars and wires are embedded, substantially as described.

6. A tank or bin wall, comprising bars arranged at intervals, wires running continuously around the bin in horizontal rows and suitably spaced, said wires connecting said bars and supported and separated thereby and strung under tension between them, and a filling material wherein said bars and wires are embedded.

7. A polygonal tank or bin, comprising upright bars arranged at intervals each having wings or flanges radiating from a common center and provided with a series of holes, wires strung under tension through said holes around the bin continuously from top to bottom thereof, and a suitable plastic material wherein said bars and wires are embedded, substantially as described.

8. A series of abutting tanks or bins polygonal in form, comprising upright bars at the meeting-points of the walls and triangular in cross-section and provided with vertical rows of holes, double rows of wires strung under tension between said bars and through the holes therein, the outer row in each bin forming a portion of the walls of the abutting bins, and a filling material wherein said bars and wires are embedded, substantially as described.

9. A tank or bin wall, comprising tension-bars composed of blades 6 radiating from a common center and having a series of holes, angle-plates 7 securing said blades together, said bars being arranged at intervals, and wires strung through said holes from bar to bar and stretched to greater than their normal length, and a suitable filling material.

In witness whereof I have hereunto set my hand this 1st day of May, 1901.

FREDERICK KEES.

In presence of—
RICHARD PAUL,
M. C. NOONAN.